US007471307B2

(12) United States Patent
Iwamoto

(10) Patent No.: US 7,471,307 B2
(45) Date of Patent: Dec. 30, 2008

(54) IMAGE FORMING APPARATUS AND METHOD OF CONTROLLING SAME

(75) Inventor: Kazuyuki Iwamoto, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 274 days.

(21) Appl. No.: 11/409,981

(22) Filed: Apr. 25, 2006

(65) Prior Publication Data

US 2006/0250495 A1 Nov. 9, 2006

(30) Foreign Application Priority Data

May 6, 2005 (JP) ............................ 2005-135429

(51) Int. Cl.

*B41J 2/47* (2006.01)
*B41J 2/385* (2006.01)
*B41J 15/14* (2006.01)
*B41J 2/435* (2006.01)
*G02B 26/08* (2006.01)

(52) U.S. Cl. ...................... 347/234; 347/116; 347/225; 347/243; 347/248; 359/204; 359/205; 359/216

(58) Field of Classification Search ...................... None
See application file for complete search history.

(56) References Cited

U.S. PATENT DOCUMENTS 6,308,018 B1 * 10/2001 Yoshida et al. ................ 399/53
6,906,739 B2 6/2005 Suzuki et al. ............... 347/233
2003/0179428 A1 * 9/2003 Suzuki et al. ............... 359/204
2004/0174427 A1 9/2004 Iwamoto ..................... 347/244
2005/0062836 A1 * 3/2005 Nakajima ................... 347/225
2005/0093968 A1 5/2005 Iwamoto ..................... 347/238
2006/0103716 A1 5/2006 Iwamoto ..................... 347/231

FOREIGN PATENT DOCUMENTS

JP 10-186250 7/1998
JP 2000-141750 5/2000
JP 2003-322811 11/2003

* cited by examiner

*Primary Examiner*—Luu Matthew
*Assistant Examiner*—Kendrick X Liu
(74) *Attorney, Agent, or Firm*—Fitzpatrick, Cella, Harper & Scinto

(57) ABSTRACT

An electrophotographic image forming apparatus senses amounts of color misregistration of toner images, which are formed using n-number (where n is a natural number and n=2 holds) of photosensitive bodies, when light beams from a plurality of light sources are made to deflect and scan across the n-number of photosensitive bodies by a single rotating polygonal mirror. The timing of light emission from the light sources is controlled in such a manner that light beams from the light sources will be deflected and scanned by mirror surfaces of the polygonal mirror, from among the plurality of mirror surfaces that form the polygonal mirror, such that the amount of color misregistration of every toner image will be less than (n−1)/n pixels.

8 Claims, 11 Drawing Sheets

FIG. 8

| COLOR OF TONER | AMOUNT OF COLOR MISREGISTRATION | VARIABLE |
|---|---|---|
| Bk | + 0.45 | A |
| C | + 0.40 | B |
| M | - 0.35 | C |
| Y | ± 0.00 | – |

FIG. 9

| COLOR OF TONER | AMOUNT OF COLOR MISREGISTRATION AFTER CORRECTION |
|---|---|
| Bk | - 0.55 |
| C | - 0.60 |
| M | - 0.35 |
| Y | ± 0.00 |

IMAGE FORMING APPARATUS AND METHOD OF CONTROLLING SAME

FIELD OF THE INVENTION

This invention relates to an electrophotographic image forming technique.

BACKGROUND OF THE INVENTION

In an image forming apparatus such as a copier or printer, generally a latent image is formed on a photosensitive drum, which is an electrostatic latent carrier, using a laser beam. Such an apparatus modulates the laser beam, which has been generated by a laser oscillator, in accordance with an image signal and irradiates the surface of a polygon mirror that is rotating at high speed. The laser beam is reflected by the rotating polygon mirror and is deflectively scanned along the axial direction (main-scan direction) of the photosensitive drum owing to such rotation of the mirror. The laser beam forms an image on the photosensitive drum via an imaging lens to thereby form an electrostatic latent image that conforms to each scanning line of the image.

A color image forming apparatus (tandem-type color image forming apparatus) known in the art has a plurality of image forming units each of which includes a laser scanning unit and a photosensitive drum. The apparatus forms images (toner images) of different colors by respective ones of the image forming units and transfers these images to a print medium in superimposed form. In a color image forming apparatus of this kind, it is necessary that the images formed by the image forming units be transferred to the print medium in a form in which the images are accurately superimposed on one another. That is, it is necessary to accurately adjust the starting point of image formation in the main-scan direction (the direction in which the laser beam is scanned across the photosensitive drum) and sub-scan direction (a direction approximately perpendicular to the main-scan direction and corresponding to the transport direction of the print medium) of each image on each photosensitive drum.

There are instances where the toner images are not in proper registration when they are superimposed on the transfer belt or recording medium. Such color misregistration is caused by a deviation in the irradiation position of each color, which is ascribable to mechanical installation error between each photosensitive body (photosensitive drum) and a scanning-type optical device (laser saner unit) and the mechanical mounting error of each of the optical components, and by driving non-uniformity of the photosensitive bodies and intermediate transfer belt (recording medium).

In an arrangement having a plurality of scanning-type optical devices provided in conformity with a plurality of photosensitive bodies, it has been proposed to reduce color misregistration in the sub-scan direction by accurately adjusting the rotational phase of each polygonal mirror in accordance with phase error exhibited by a beam detection signal of each scanning-type optical device (see the specification of Japanese Patent Application Laid-Open No. 2000-141750).

A conventional image forming apparatus provided with scanning-type optical devices the number of which is the same as the number of photosensitive bodies is inevitably high in price and large in size. In order to lower cost and reduce size, a scanning-type optical device that makes common use of a single polygonal mirror while using a plurality of light sources is advantageous. In the scanning-type optical device, light beams from a plurality of laser sources are concurrently deflected and scanned by the single polygonal mirror and expose on corresponding photosensitive bodies.

With such a scanning-type optical device, however, the technique set forth in the above-mentioned specification cannot be applied in order to adjust color misregistration. The reason for this is that since common use is made of a single polygonal mirror, it is theoretically impossible to adjust the rotational phase of the polygonal mirror on a color-by-color basis. Accordingly, adjustment of color misregistration must be performed by changing the mirror surface of the polygonal mirror for every light beam of each color. With this method, however, a problem which arises is that a maximum of one pixel of color misregistration (one scanning-line interval) is produced along the sub-scan direction.

A feature of the present invention is to solve this problem and at least one other problem of the prior art. Other problems of the prior art will be understood through a reading of the entire specification.

SUMMARY OF THE INVENTION

In accordance with the present invention, the amount of color misregistration of each toner image formed using n-number (where n is a natural number and $n \geqq 2$ holds) of photosensitive bodies is sensed when light beams from a plurality of light sources are deflectively scanned across the n-number of photosensitive bodies by a single rotating polygonal mirror. The polygonal mirror is constituted by a plurality of mirror surfaces. The light-emission timings of the light sources are controlled in such a manner that light beams from the light sources will be deflectively scanned by those mirror surfaces of the polygonal mirror for which the amount of color misregistration of each toner image will be less than $(n-1)/n$ pixels.

In accordance with the present invention, there is provided a low-cost, compact, high-quality color image forming apparatus that has a color misregistration in the sub-scan direction of less than $(n-1)/n$ pixels at maximum.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a diagram illustrating an example of storage of amounts of color misregistration according to the first embodiment;

FIG. 9 is a diagram illustrating an example of storage with regard to amount of color misregistration after correction;

DETAILED DESCRIPTION OF THE PREFERRED EMBODIMENTS

Preferred embodiments of the present invention will now be described in detail in accordance with the accompanying drawings.

First Embodiment

The present invention will be described with regard to a first embodiment in which the invention is applied to a tandem-type color image forming apparatus (printer).

Figure 1:
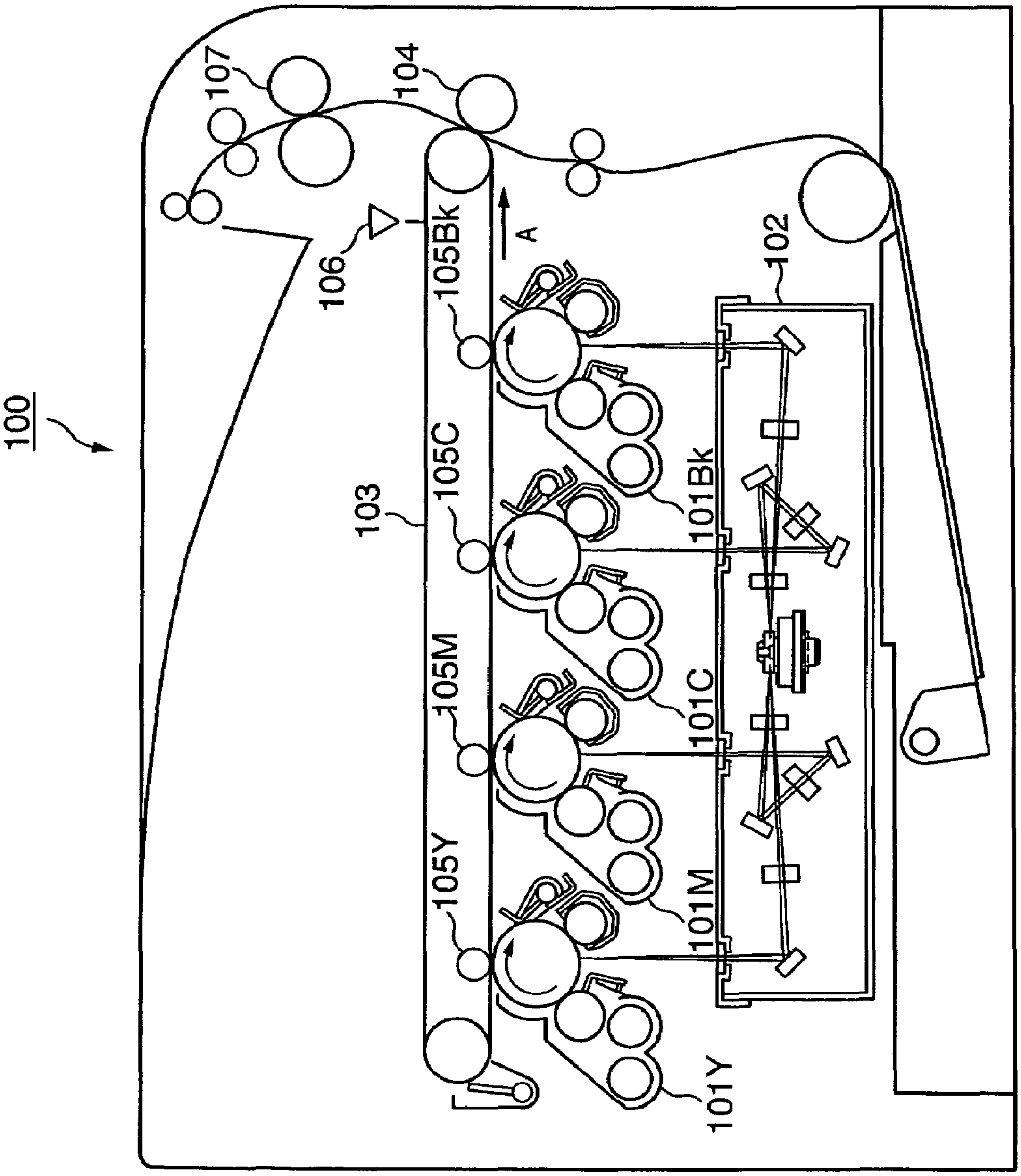
FIG. 1 is a schematic sectional view illustrating a tandem-type color printer according to a first embodiment of the present invention.

FIG. 1 is a schematic sectional view illustrating a tandem-type color printer 100 according to an embodiment of the present invention. The color printer 100 has four image forming sections (image forming units). More specifically, the color printer 100 has an image forming section 101Bk for forming a black image, an image forming section 101C for forming a cyan image, an image forming section 101M for forming a magenta image, and an image forming section 101Y for forming a yellow image. These four image forming sections 101Bk, 101C, 101M and 101Y are arranged in a row at regular intervals. A scanning-type optical device 102 is a unit for exposing photosensitive bodies of the image forming sections to light. An intermediate transfer belt 103 is a transfer body on which toner images of each of the colors are formed in superimposed fashion. A transfer roller 104 is a roller that transfers the toner images, which have been formed on the intermediate transfer belt 103, to a recording medium. Transfer rollers 105Bk, 105C, 105M and 105Y are rollers for transferring the toner images, which have been formed on the photosensitive bodies, to the intermediate transfer belt 103. A registration sensor 106 is for sensing amount of color misregistration. The registration sensor 106 senses a registration correction pattern of each color formed on the intermediate transfer belt 103, thereby sensing the amount of color misregistration with respect to yellow, which is a reference color in this embodiment. The reason for adopting yellow as the reference color is that since the image forming section 101Y is the one farthest from a fixing unit 107, it is least affected by a change in dimensions resulting from thermal expansion of component parts due to the heat produced by the fixing unit.

Figure 2:
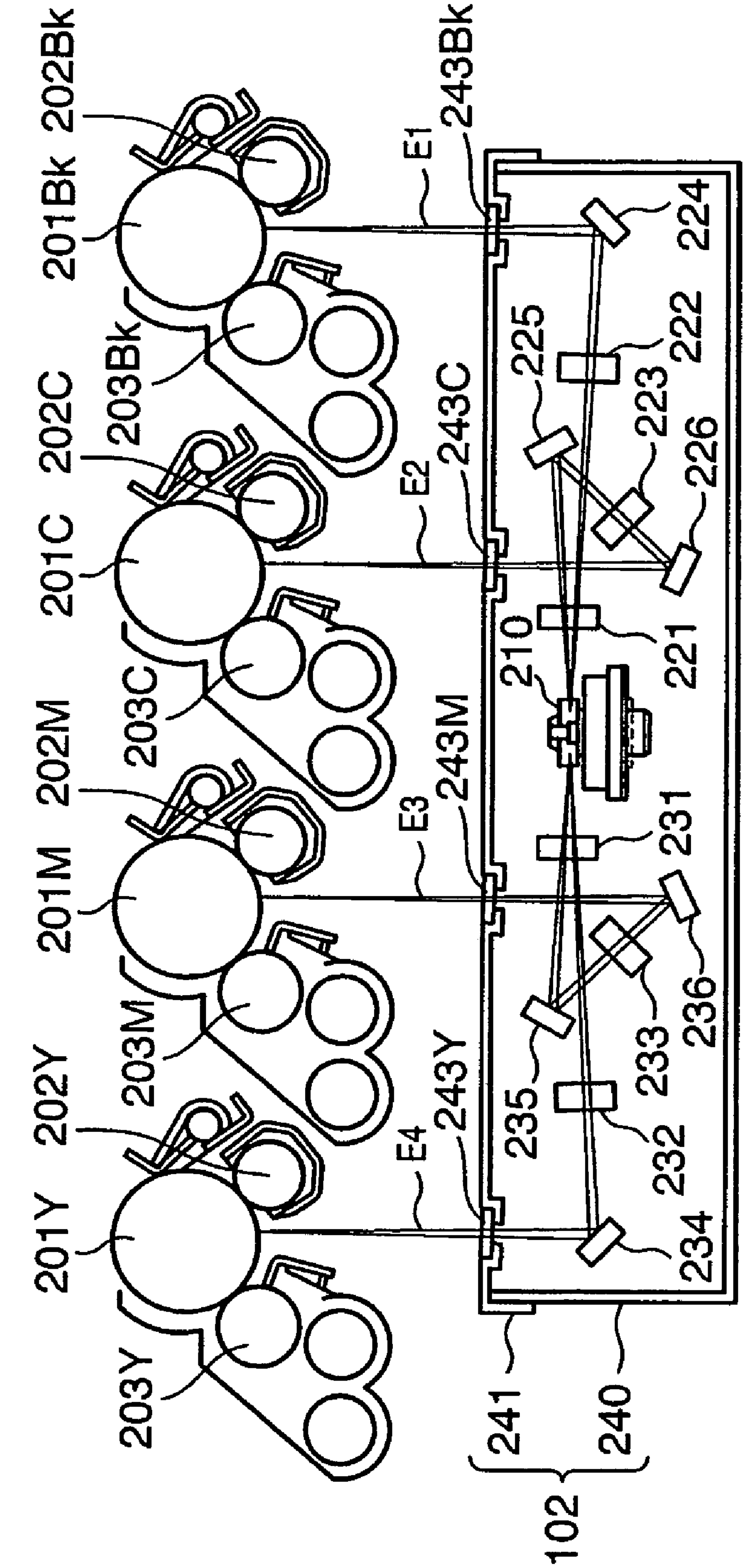
FIG. 2 is a schematic sectional view illustrating a scanning-type optical device and image forming sections according to the first embodiment.

FIG. 2 is a schematic sectional view illustrating the scanning-type optical device 102 and image forming sections according to the embodiment. The image forming sections 101Bk, 101C, 101M and 101Y include drum-type photosensitive bodies (referred to as "photosensitive drums" below) 201Bk, 201C, 201M and 201Y, respectively. Arranged surrounding the photosensitive drums 201Bk, 201C, 201M, 201Y are primary charging units 202Bk, 202C, 202M, 202Y and developing units 203Bk, 203C, 203M, 203Y, respectively.

The developing units 203Bk, 203C, 203M, 203Y accommodate black toner, cyan toner, magenta toner and yellow toner, respectively. The photosensitive drums 201Bk, 201C, 201M, 201Y are negatively charged OPC photosensitive bodies having a photoconductive layer on a drum substrate made of aluminum. The drums are rotatively driven in the direction of the arrows (clockwise in FIG. 1) at a prescribed process speed by drive units (not shown). The primary charging units 202Bk, 202C, 202M, 202Y serving as primary charging means charge the surfaces of the photosensitive drums 201Bk, 201C, 201M, 201Y uniformly to a prescribed potential of negative polarity by a charging bias supplied from a charging bias power supply (not shown).

The developing units 203Bk, 203C, 203M, 203Y fix toners of the respective colors to electrostatic latent images, which are formed on respective ones of the photosensitive drums 201Bk, 201C, 201M, 201Y, thereby developing (visualizing) these images as toner images.

The transfer rollers 105Bk, 105C, 105M, 105Y shown in FIG. 1 are in contact with the photosensitive drums 201Bk, 201C, 201M, 201Y, respectively, via the intermediate transfer belt 103.

An optical case 240 houses each of the optical components of the scanning-type optical device 102. A top cover 241 is attached to the optical case 240, thereby sealing the scanning-type optical device 102 and preventing dust and toner, etc., from penetrating into the interior of the scanning-type optical device 102. The top cover 241 is provided with slit-shaped openings at positions corresponding to the photosensitive drums 201Bk, 201C, 201M, 201Y. Transparent dust-proof glass members 243Bk, 243C, 243M, 243Y are mounted in the top cover 241. As a result, it is possible for the photosensitive drums 201Bk, 201C, 201M, 201Y to be exposed to scanning light through the dust-proof glass members 243Bk, 243C, 243M, 243Y, respectively, but dust and toner can be prevented from penetrating into the interior of the scanning-type optical device 102.

A polygonal mirror 210 is housed within the optical case 240. The polygonal mirror 210 is rotated at a fixed speed by a motor (not shown), thereby causing light beams, which are emitted from semiconductor lasers (402 and 403 in FIG. 4), to be deflected and scanned. A first image forming lens 221 is an f-θ (f-theta) lens which, together with second image forming lenses 222, 223, causes the laser beams to be scanned at equal speeds and causes a spot to be formed on each of the photosensitive drums. The first image forming lens 221 is constituted by a cylinder lens in order that the light beams emitted from the plurality of semiconductor lasers will impinge thereon at angles that differ from one another. Further, along the sub-scan direction, the light beam from the first semiconductor laser (402 in FIG. 4) has its image formed by the second image forming lens 222, and the light beam from the second semiconductor laser (403 in FIG. 4) has its image formed by the second image forming lens 223.

Return mirrors 224, 225 and 226 reflect the light beams in a prescribed direction. More specifically, a final return mirror 224 is disposed with respect to the light beam from the first semiconductor laser, a separating return mirror 225 is disposed with respect to the light beam from the second semiconductor laser, and a final return mirror 226 is disposed with respect to the light beam from the second semiconductor laser. By thus causing the light beam from the second semiconductor laser to be reflected multiple times by the separating return mirror 225 and the final return mirror 226, this light beam can be made to have substantially the same optical path length as that of the light beam from the first semiconductor laser by effectively exploiting the small space available.

Figure 5:
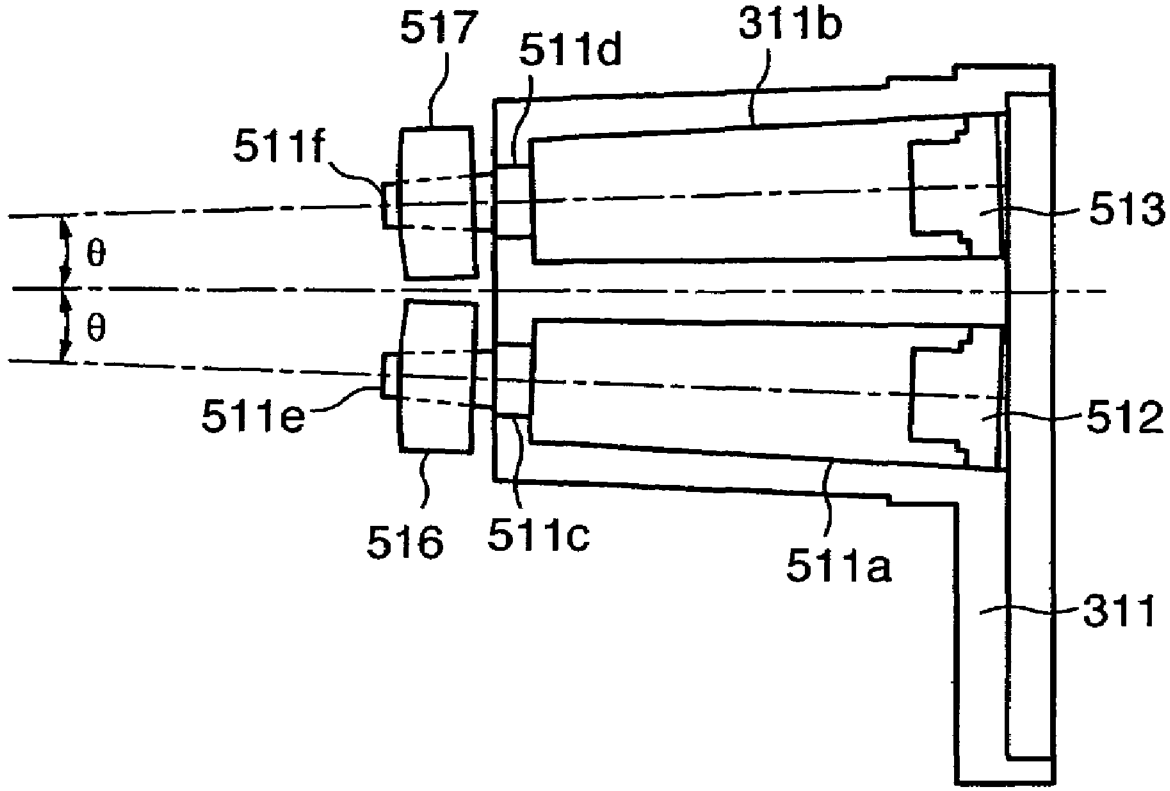
FIG. 5 is a sectional view of a laser holder.

Disposed on the opposite side of the polygonal mirror 210 are a first image forming lens 231 and second image forming lenses 232, 233 corresponding to third and fourth semiconductor lasers (512 and 513 in FIG. 5). Also provided are a final return mirror 234 disposed with respect to the light beam from the fourth semiconductor laser, and a separating return mirror 235 and final return mirror 236 disposed with respect to the light beam from the third semiconductor laser. By thus causing the light beam from the third semiconductor laser to be reflected multiple times by the separating return mirror 235 and the final return mirror 236, this light beam can be made to have substantially the same optical path length as that of the light beam from the fourth semiconductor laser by effectively exploiting the small space available. As a result, it is possible to make the scanning-type optical device 102 more compact.

Figure 3:
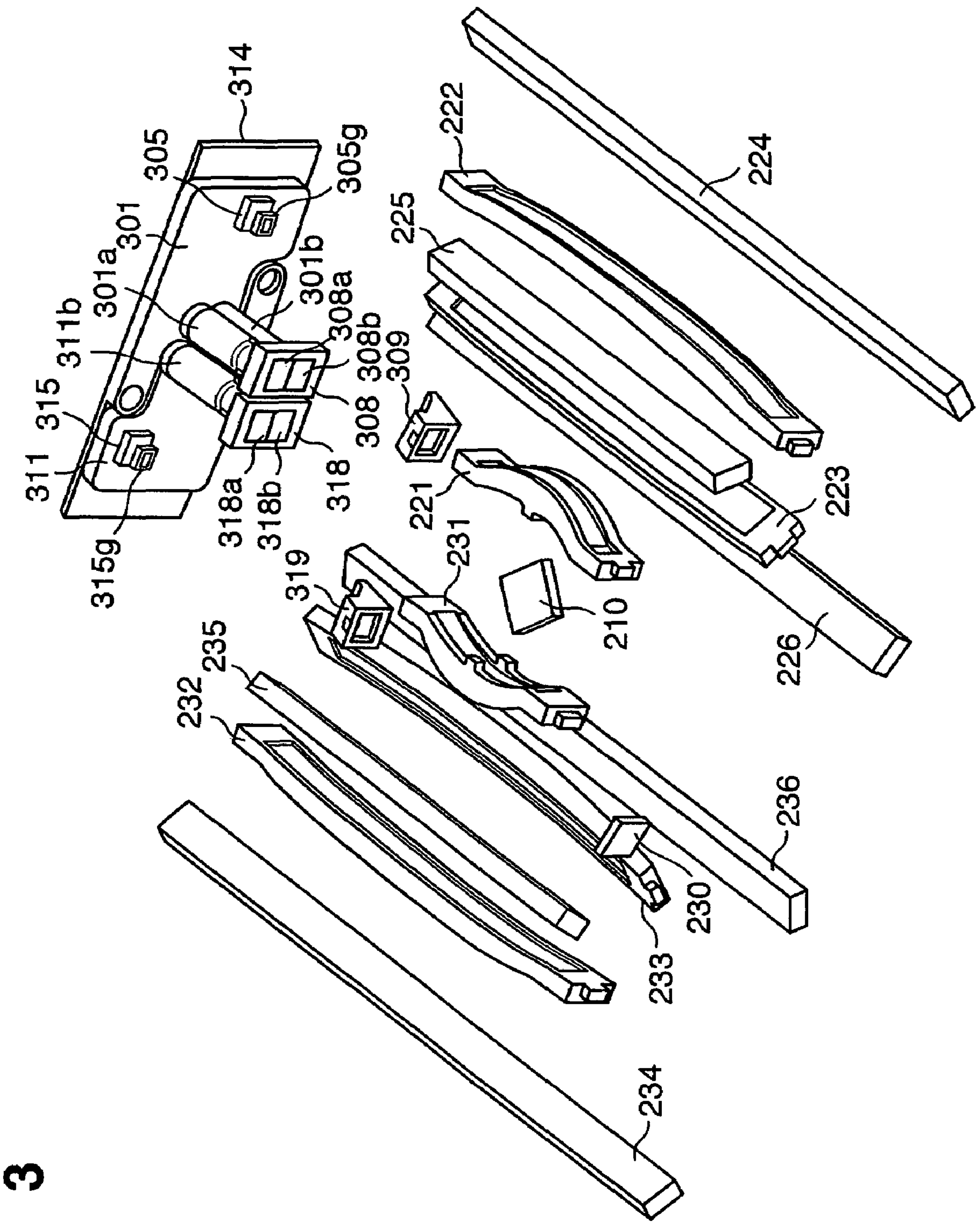
FIG. 3 is a perspective view illustrating the entire structure of the scanning-type optical device.
Figure 4:
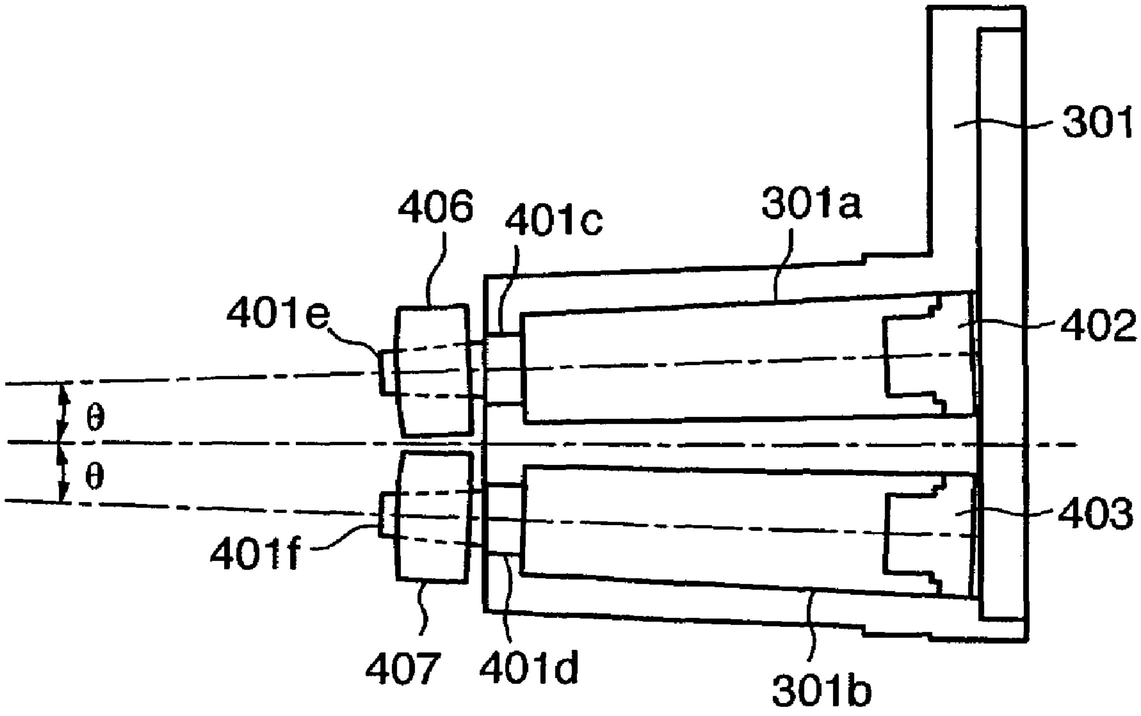
FIG. 4 is a sectional view of a laser holder.

FIG. 3 is a perspective view illustrating the entire structure of the scanning-type optical device, and FIGS. 4 and 5 are sectional views of a laser holder unit. A laser holder 301 has barrel holding portions 301*a*, 301*b* into which semiconductor lasers (single-beam lasers) 402, 403 serving as light sources are respectively pressed-fitted so as to be held thereby. The barrel holding portions 301*a*, 301*b* are arranged with their optic axes skewed in such a manner that the optical paths of the semiconductor lasers 402, 403 intersect while forming a prescribed angle θ with respect to the sub-scan direction. Portions forming the exteriors of the barrels are integrated. This makes it possible for the semiconductor lasers 402, 403 to be held in close proximity to each other. Diaphragm portions 401*c*, 401*d* corresponding to the semiconductor lasers 402, 403, respectively, are provided at the distal ends of the barrel holding portions 301*a*, 301*b*, thereby forming the light beams emitted from the semiconductor lasers 402, 403 into the desired optimum beam shapes. Affixing portions 401*e*, 401*f* of collimator lenses 406, 407, respectively, are provided at two locations each along the main-scan direction forwardly of the barrel holding portions 301*a*, 301*b*. The collimator lenses 406, 407 convert the light beams, which have passed through the diaphragm portions 401*c*, 401*d*, to substantially parallel light beams. When the irradiating positions of the collimator lenses 406, 407 are adjusted and their positions decided while sensing the optical characteristics of the laser beams, a bonding agent of the type curable by ultraviolet light is irradiated with an ultraviolet beam, whereby the collimator lenses 406, 407 are affixed and secured in the affixing portions 401*e*, 401*f*.

The side wall of the optical case 240 is provided with a fitting hole and a slot along the sub-scan direction in order to position the laser holder 301. As a result, fitting portions provided on the external portions of the barrel holding portions 301*a*, 301*b* of the laser holder 301 are fitted to thereby mount the laser holder 301. Thus, the laser holder 301 is mounted on the optical case 240 by fitting the fitting portions provided on the external portions of the barrel holding portions 301*a*, 301*b* that hold the semiconductor lasers 402, 403 and form the optical paths. As a result, the positional relationship between the semiconductor lasers 402, 403 and the optical components housed in the optical case 240 can be assured to a high degree of precision.

A laser holder 311 is a component identical with the laser holder 301 and has barrel holding portions 511*a*, 311*b* into which semiconductor lasers 512, 513 are respectively pressed-fitted so as to be held thereby. An electric circuit board 314 is electrically connected to the semiconductor lasers 402, 403, 512, 513 and includes a laser driving circuit. Reference numerals 305, 315 denote BD (Beam Detect) sensors provided on the electric circuit board 314. The BD sensors 305, 315 sense light beams reflected by the polygonal mirror 210 and output synchronizing signals along the main-scan direction. This makes it possible to adjust the timing of the scanning start position at the edge of an image. The barrel holding portions 511*a*, 311*b* are arranged with their optic axes skewed in such a manner that the optical paths of the semiconductor lasers 512, 513 intersect while forming a prescribed angle θ (theta) with respect to the sub-scan direction. Portions forming the exteriors of the barrels are integrated. Diaphragm units 511*c*, 511*d* corresponding to the semiconductor lasers 512, 513, respectively, are provided at the distal ends of the barrel holding portions 511*a*, 311*b*, thereby forming the light beams emitted from the semiconductor lasers 402, 403 into the desired optimum beam shapes. Affixing portions 511*e*, 511*f* of collimator lenses 516, 517, respectively, are provided at two locations each along the main-scan direction forwardly of the barrel holding portions 511*a*, 311*b*. In a manner similar to that of the collimator lenses 406, 407, the collimator lenses 516, 517 are adjusted in terms of irradiating position and focus and are fixedly secured to affixing portions 511*e*, 511*f*, respectively.

A BD slit 315*g* of laser holder 311 is placed on the side opposite the laser holder 301, and a BD slit 305*g* of laser holder 301 is placed on the side opposite the laser holder 311. That is, the laser holder 311 is disposed in the same plane as that of the optical case 240 in such a manner that with the laser holder 301 rotated 180°. the position of semiconductor laser 512 is situated alongside the semiconductor laser 403 and the position of the semiconductor laser 513 is situated alongside the semiconductor laser 402. As a result, it is possible to dispose the semiconductor lasers so as to shorten the spacing between the semiconductor lasers 402, 403 and semiconductor lasers 512, 513 in the main-scan direction in conformity with the reflecting surface of the polygonal mirror 210 toward the opposing scanning optical system.

Thus, even in a case where the semiconductor lasers 402, 403, 512, 513 are placed along the same direction, the angle capable of being scanned can be enlarged by the polygonal mirror 210 and the optical path length of the scanning optical system can be reduced. Further, since there are no light-incidence components on the opposite side of the plane on which the laser holders 301, 311 sandwiching the polygonal mirror 210 are disposed, the distance to the polygonal mirror 210 can be reduced, thereby making it possible make the scanning-type optical device more compact.

The positioning of the laser holder 311 relative to the optical case 240 is performed in a manner similar to that of the laser holder 301. As a result, the positional relationship between the semiconductor lasers 512, 513 and the optical components housed in the optical case 240 can be assured to a high degree of precision.

A cylindrical lens 308 having a prescribed refracting power only in the sub-scan direction is integrally formed to include lens portions 308*a*, 308*b* corresponding to the light beams emitted from the semiconductor lasers 402, 403. A BD lens 309 forms the image of the light beam, which has been reflected by the polygonal mirror 210, on the photoreceptor surface of the BD sensor 305. The BD slit 305*g* provided in the laser holder 301 is placed directly in front of the BD sensor 305. Since the BD slit 305*g* is an opening that is narrow in the main-scan direction and long in the sub-scan direction, the light beam can be sensed accurately in the main-scan direction by limiting the light beam, which is received by the BD sensor 305, in the main-scan direction. In this embodiment, the BD sensor 305 and BD slit 305*g* are provided at a position corresponding to the semiconductor laser 402, but a BD sensor corresponding to the semiconductor laser 403 is not provided. The reason for this is that the since semiconductor lasers 402, 403 are provided on the single laser holder 301 in the sub-scan direction, the timing of the scanning starting position of the edge of the image by the semiconductor laser 403 can be made the same as that of the semiconductor laser 402.

A cylindrical lens 318 having a prescribed refracting power only in the sub-scan direction is integrally formed to include lens portions 318*a*, 318*b* corresponding to the light beams emitted from the semiconductor lasers 512, 513. A BD lens 319 forms the image of the light beam, which has been reflected one more time by a reflecting mirror 230 following reflection by the polygonal mirror 210, on the photoreceptor surface of the BD sensor 315. The BD slit 315*g* provided in the laser holder 301 is placed directly in front of the BD sensor 315. Since the BD slit 315*g* is an opening that is narrow in the main-scan direction and long in the sub-scan direction, the light beam can be sensed accurately in the main-scan direction by limiting the light beam, which is received by the BD sensor 315, in the main-scan direction. In this embodiment, the BD sensor 315 and BD slit 315*g* are provided at a position corresponding to the semiconductor laser 512, but a BD sensor corresponding to the semiconductor laser 513 is not provided. The reason for this is that the since semiconductor lasers 512, 513 are provided on the single laser holder 311 in the sub-scan direction, the timing of the scanning starting position of the edge of the image by the semiconductor laser 513 can be made the same as that of the semiconductor laser 512.

Described next will be the flow up to exposure of the photosensitive drums 201Bk, 201C, 201M, 201Y to the light beams from the semiconductor lasers 402, 403, 512, 513 as scanning light E1, E2, E3, E4.

The light beams emitted from the semiconductor lasers 402, 403 have the sizes of their cross sections limited by the diaphragm portions 401*c*, 401*d* of the laser holder 301. The light beams are converted to substantially parallel light beams by the collimator lenses 406, 407 and impinge upon the lens portions 308*a*, 208*b* of the cylindrical lens 308. Each light beam that has impinged upon the cylindrical lens 308 passes through as is in the cross section of the main scan. In the cross section of the sub-scan, on the other hand, the light beam is converged and forms an image on the same surface of the polygonal mirror 210 substantially as a line image. At this time the light beams impinge obliquely at the angle θ with respect to the sub-scan direction. The light beams are emitted at the angle θ (theta) with respect to the sub-scan direction while being deflected and scanned owing to rotation of the polygonal mirror 210. Of the two light beams that have been emitted from the polygonal mirror 210, the light beam emitted from the semiconductor laser 402 passes through the BD slit 305*g* provided in the laser holder 301 and is received by the BD sensor 305. At this time the light beam can be sensed accurately in the main-scan direction by limiting the light beam in the main-scan direction. The BD sensor 305 senses the light beam that has been emitted from the semiconductor laser 402, outputs a synchronizing signal and regulates the timing of the scanning starting position of the edge of the image by the semiconductor lasers 402, 403.

Since the semiconductor lasers 402, 403 are provided on the single laser holder 301 in the sub-scan direction, the timing of the scanning starting position of the edge of the image by the semiconductor laser 403 can be made a timing that is substantially the same as that of the semiconductor laser 402. The timing-adjusted light beams emitted from the semiconductor lasers 402, 403 pass through the first image forming lens 221.

The light beam that has been emitted from the semiconductor laser 402 then passes through the second image forming lens 222, is reflected by the final return mirror 224, passes through the dust-proof glass 243Bk and exposes the photosensitive drum 201Bk as the scanning light E1. Meanwhile, the light beam that has been emitted from the semiconductor laser 403 is reflected downward by the separating return mirror 225. This light beam then passes through the second image forming lens 223, is reflected by the final return mirror 226, passes through the dust-proof glass 243M and exposes the photosensitive drum 201C as the scanning light E2.

Further, the light beams emitted from the semiconductor lasers 512, 513 have the sizes of their cross sections limited by the diaphragm portions 511*c*, 511*d* of the laser holder 311. The light beams are converted to substantially parallel light beams by the collimator lenses 516, 517 and impinge upon the lens portions 318*a*, 318*b* of the cylindrical lens 318. Each light beam that has impinged upon the cylindrical lens 318 passes through as is in the cross section of the main scan. In the cross section of the sub-scan, on the other hand, the light beam is converged and forms an image on the same surface of the polygonal mirror 210 substantially as a line image. At this time the light beams impinge obliquely at the angle θ (theta) with respect to the sub-scan direction. The light beams are emitted at the angle θ (theta) with respect to the sub-scan direction while being deflected and scanned owing to rotation of the polygonal mirror 210. Of the two light beams that have been emitted from the polygonal mirror 210, the light beam that has been emitted from the document information 512 and reflected by the polygonal mirror 210 is reflected one more time by the reflecting mirror 230. This light beam then passes through the BD slit 315*g* provided in the laser holder 311 and is received by the BD sensor 315. At this time the light beam can be sensed accurately in the main-scan direction by limiting the light beam in the main-scan direction. The BD sensor 315 senses the light beam that has been emitted from the semiconductor laser 402, outputs a synchronizing signal and regulates the timing of the scanning starting position of the edge of the image by the semiconductor lasers 512, 513.

Since the semiconductor lasers 512, 513 are provided on the single laser holder 311 in the sub-scan direction, the timing of the scanning starting position of the edge of the image by the semiconductor laser 513 can be made a timing that is substantially the same as that of the semiconductor laser 512. The timing-adjusted light beams emitted from the semiconductor lasers 512, 513 pass through the first image forming lens 231.

The light beam that has been emitted from the semiconductor laser 512 is reflected downward by the separating return mirror 235. The light beam then passes through the second image forming lens 232 and is reflected by the final return mirror 236. Further, the light beam passes through the dust-proof glass 243M and exposes the photosensitive drum 201M as the scanning light E3. Meanwhile, the light beam that has been emitted from the semiconductor laser 403 passes through the second image forming lens 232, is reflected by the final return mirror 234, passes through the dust-proof glass 243Y and exposes the photosensitive drum 201Y as the scanning light E4.

Figure 6:
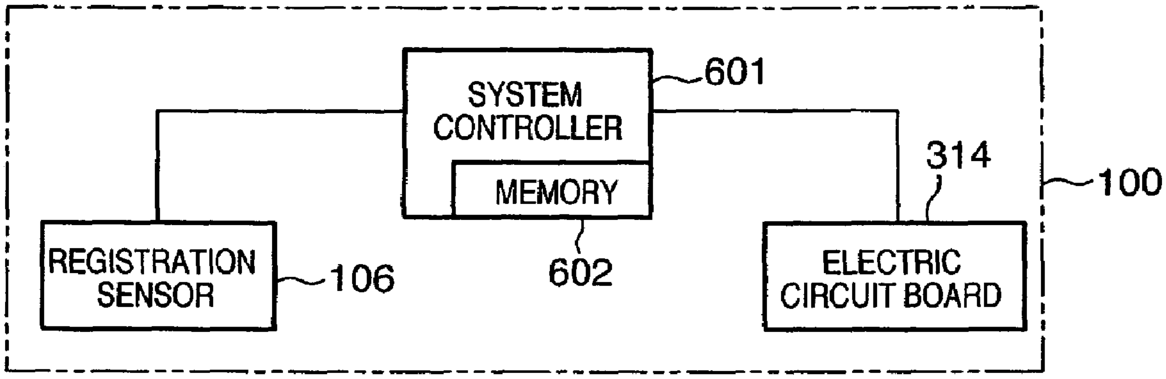
FIG. 6 is a block diagram illustrating a tandem-type color printer according to the first embodiment.

FIG. 6 is a block diagram illustrating a tandem-type color printer according to the embodiment. A system controller 601, which comprises a CPU, ROM, RAM or ASIC, etc., controls image formation processing of the color printer 100 (inclusive of processing for forming a pattern for correcting registration) and processing for transporting transfer paper. By way of example, if a pattern for correcting registration is formed, the system controller 601 instructs a laser driving circuit included on the electric circuit board 314 to perform a laser emission. As a result, the photosensitive drums 201Bk, 201C, 201M, 201Y that have been charged by the primary charging devices 202Bk, 202C, 202M, 202Y, respectively, are exposed and the corresponding electrostatic latent images of registration correcting patterns for each of the colors are formed. The frictionally charged toners of each of the colors are subsequently made to adhere to the electrostatic latent images in the developing units 203Bk, 203C, 203M, 203Y, whereby toner images of registration correcting patterns for each of the colors are formed on the photosensitive drums 201Bk, 201C, 201M, 201Y. These toner images are transferred from the photosensitive drums 201Bk, 201C, 201M, 201Y to the intermediate transfer belt 103 at each of primary transfer nip portions. A memory 602 provided within the system controller 601 stores the amount of color misregistration relative to the reference color (yellow) sensed by the registration sensor 106. When an image is formed, the system controller 601 selects the mirror surface of the polygonal mirror 210 that corresponds to each color and controls exposure, thereby correcting registration.

The system controller 601 acts as a control device for controlling light-emission timing of said light sources in such a manner that the light beams from said light sources will be deflected and scanned by the selected mirror surfaces.

Described next will be a method of deciding amount of registration correction for making the amount of color misregistration less than (n−1)/n pixels at maximum by correcting registration in a color image forming apparatus that deflectively scans n-number of photosensitive drums using a single polygonal mirror.

The system controller 601 also acts as a selecting device for selecting a mirror surface of the rotating polygonal mirror in such a manner that the amount of color misregistration of every toner image will be less than (n−1)/n pixels.

Figure 7:
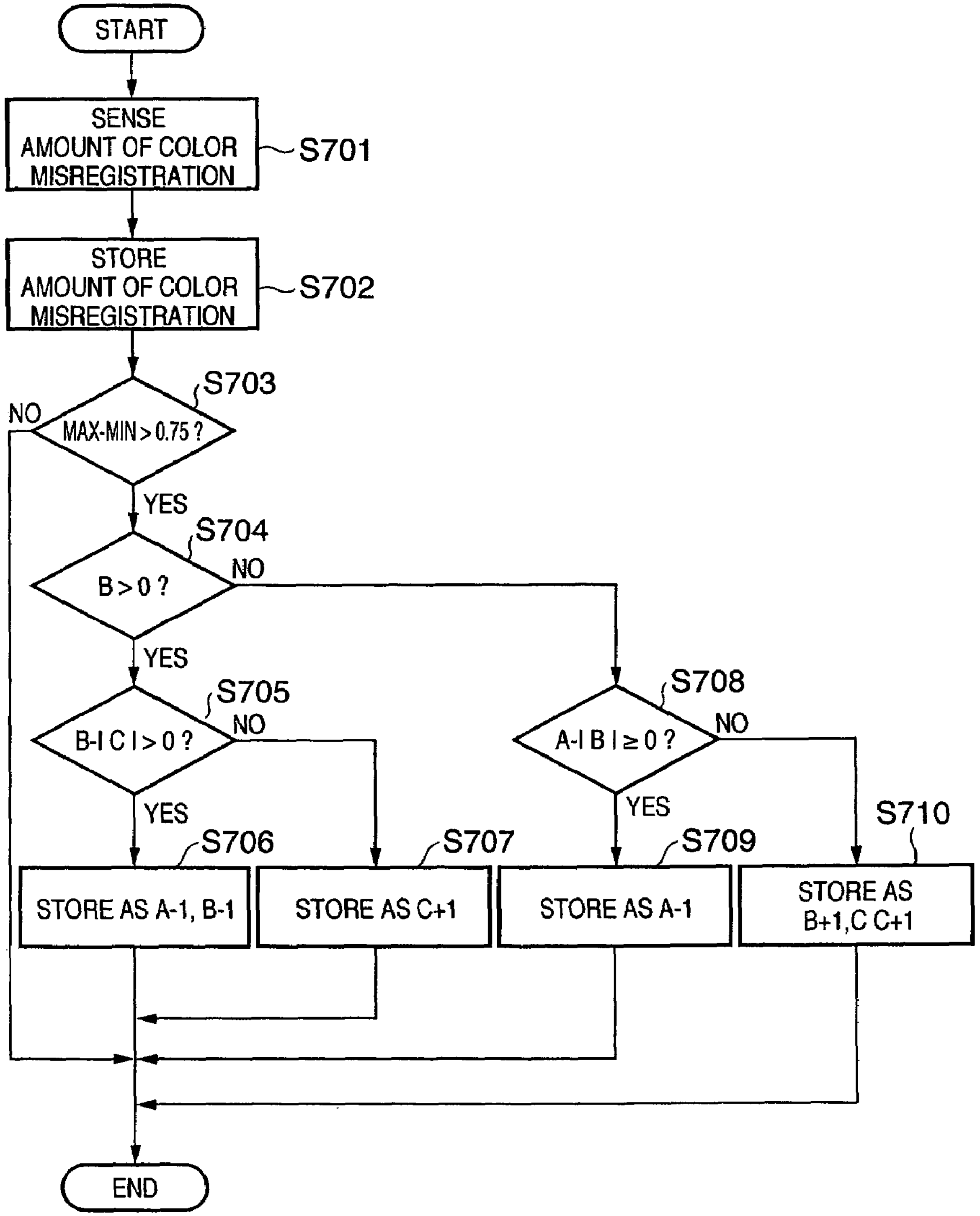
FIG. 7 is an illustrative flowchart of processing for correcting for color misregistration according to the first embodiment.

FIG. 7 is an illustrative flowchart of processing for correcting for color misregistration according to an embodiment of the present invention. It is preferred that processing for selecting a mirror surface of the polygonal mirror 210 be executed after a prescribed number of sheets of transfer paper are printed on or upon elapse of a prescribed period of time after the power supply of the color printer 100 is turned on. However, this may just as well be executed at another timing.

Since there are four photosensitive drums, namely the photosensitive drums 201Bk, 201C, 201M and 201Y, this embodiment, the mirror surface of the polygonal mirror 210 is selected in such a manner that the amount of color misregistration will be less than (4−1)/4=0.75 pixel at maximum.

It should be noted that there are cases where a color image forming apparatus is composed of three photosensitive drums for the colors cyan, magenta and yellow, and cases where n is five or greater, in which a transparent color, gold, silver, light cyan and light magenta, etc., are added as special colors to the colors of black, cyan, magenta and yellow.

At step S701 in FIG. 7, the system controller 601 causes the registration sensor 106 to sense the registration correcting pattern of each color formed on the intermediate transfer belt 103, whereby the amount of color misregistration of each color relative to the reference color (yellow) is sensed. The amount of color misregistration is recognized as a shift in the position at which the toner image is formed.

At step S702, if the amount of color misregistration of each of the colors (other than yellow) relative to the reference color (yellow) falls within a range of ±0.5 pixel, then the system controller 601 stores the amounts of color misregistration of these colors in the memory 602 as A, B, C in order of decreasing size.

FIG. 8 is a diagram illustrating an example of storage of amounts of color misregistration according to an embodiment. In the example of FIG. 8, the amount of color misregistration of the black toner Bk is +0.45. Since this is the largest amount of color misregistration, it is stored in the memory 602 as maximum value A. The amount of color misregistration of the magenta toner M is −0.35. Since this is the smallest amount of color misregistration, it is stored in the memory 602 as minimum value C. Further, the amount of color misregistration of the cyan toner C is +0.40. Since this is neither the maximum nor the minimum value, it is stored as an intermediate value B. With regard to the amount of color misregistration of the yellow toner Y, it is obvious that this is zero in terms of the properties thereof and therefore there is little need to store it in the memory 602. However, it is illustrated in FIG. 8 in order to make it easier to understand that the amounts of color misregistration of the toners of the other colors have been calculated with the yellow toner Y serving as the reference.

Next, at step S703, the system controller 601 determines whether the difference between the maximum value (A) and minimum value (C) of the detected amounts of color misregistration is greater than 0.75. If it is determined that the difference does not exceed 0.75 ("NO" at step S703), this means that the amount of color misregistration is already within tolerance (0.75 pixel) and therefore it is unnecessary to revise the combination of mirror surface of the polygonal mirror 210 and light beam corresponding to each color. Accordingly, processing according to this flowchart is terminated.

On the other hand, if it is determined that the difference exceeds 0.75, then the combination with the mirror surface of the polygonal mirror 210 at the present time is inappropriate. In this case, the maximum value A of amount of color misregistration is on the plus side of yellow and A≧0.25 pixel is satisfied (because the smallest value that C can take on is −0.5). Furthermore, the minimum value C of amount of color misregistration is on the minus side of yellow and C≦−0.25 pixel is satisfied (because the largest value that A can take on is +0.5).

Next, at step S704, the system controller 601 determines whether the amount B of color misregistration, which is neither the sensed maximum value A of color misregistration nor the sensed minimum value C, is a positive value (i.e., whether B>0 holds). If B is a positive value, A and B are on the plus side of yellow and therefore control proceeds to step S705. Otherwise, control proceeds to step S708.

Next, at step S705, the system controller 601 determines which of B or C is an amount of color misregistration that is small relative to yellow. For example, the system controller 601 determines whether the difference between B and the absolute value of C is positive (i.e., whether B−|C|>0 holds). Control proceeds to step S706 if the difference is a positive value and to step S707 if it is not.

If a "YES" decision is rendered at step S705, then, in order to reduce the amount of color misregistration, the system controller 601 decrements the values of A and B and writes the results in the memory 602 at step S706. As a result, with regard to the toner for which the amount of color misregistration detected by the registration sensor 106 is maximum (A) and the toner for which the amount of color misregistration detected by the registration sensor 106 is the intermediate value (B), the mirror surface of the polygonal mirror 210 is changed to the minus side, which is one rearward. It should be noted that the reason for decrementing the values of A and B is that one mirror surface of the polygonal mirror corresponds to one dot (line) in the sub-scan direction. For example, if it is assumed that a certain line in the sub-scan direction has been formed by a certain mirror surface, then the adjacent line will be formed by the adjacent mirror surface. One more reason is that in a case where the polygonal mirror is rotated at a fixed speed, in principle a color misregistration in the sub-scan direction can be corrected only in single-dot units.

The reason for the foregoing is that if the difference between B and the absolute value of C is positive, then C will have a smaller amount of color misregistration than B with respect to yellow. In other words, we have B>0.25 and, as a result, |C+1|>|B−1| holds. The amounts of color misregistration of the colors other than yellow are all negative. Among these, the smallest value after the correction is B−1 (the toner of B has the greatest offset from yellow). Since B−1>−0.75 holds, maximum value after correction (this value is zero for yellow)−minimum value after correction ($B$−1) >0.75 pixel is satisfied. Accordingly, the amount of color misregistration among the toners of four colors falls within 0.75 pixel and therefore the processing of this flowchart is terminated.

If a "NO" decision is rendered at step S705, on the other hand, the amount of color misregistration of B relative to yellow is equal to or less than that of C and |C+1|≦|B−1| holds. Accordingly, the system controller 601 increments C and writes the result in the memory 602 at step S707 so as to reduce the amount of color misregistration. As a result, with regard to the toner for which the amount of color misregistration detected by the registration sensor 106 is minimum (C), the mirror surface of the polygonal mirror 210 is changed to the plus side, which is one forward. Accordingly, the maximum value of amount of color misregistration becomes C+1.Moreover, C+1≦0.75 holds. As a result, maximum value ($C$+1) of amount of color misregistration−minimum value (this value is zero for yellow) of amount of color misregistration=0.75 pixel holds and the processing of this flowchart is terminated.

If a "NO" decision is rendered at step S704, then B and C will be on the minus side of yellow. At step S708, therefore, the system controller 601 determines which of A or B is an amount of color misregistration that is small relative to yellow. For example, the system controller 601 determines whether the difference between the maximum value A of amount of color misregistration detected and the absolute value of the intermediate value B is equal to or greater than zero (i.e., whether A−|B|≧0 holds). If this difference is equal to or greater than zero ("YES" at step S708), then control proceeds to step S709.

The system controller 601 decrements the value of A and writes the result in the memory 602 at step S709. As a result, with regard to the toner for which the amount of color misregistration detected by the registration sensor 106 is maximum (A), the mirror surface of the polygonal mirror 210 is changed to the minus side, which is one rearward.

In other words, if A−|B|≧0 holds, then the amount of color misregistration of the toner of B relative to yellow is equal to or less than that of A. Moreover, |A−1|≦|B+1| holds. Therefore, with regard to the toner of A, the mirror surface of the polygonal mirror 210 is changed to the minus side, which is one rearward. Accordingly, with regard to the amounts of color misregistration of the four toners, the zero of yellow is the maximum value, A−1 is the minimum value and, moreover, A−1≧−0.75 holds. Accordingly, maximum value (zero for yellow) of amount of color misregistration−minimum value of amount of color misregistration=0.75 pixel holds and the correction of amount of color misregistration is terminated.

If a "NO" decision is rendered at step S708, this means that the toner of A will have a smaller amount of color misregistration than the toner of B with respect to yellow. Further, we have B<−0.25 and |A−1|>|B+1|. Control therefore proceeds to step S710. Here the system controller 601 stores B+1 and C+1 in the memory 602 so as to reduce the amount of color misregistration. As a result, with regard to the toner for which the amount of color misregistration detected by the registration sensor 106 is minimum (C), the mirror surface of the polygonal mirror 210 is changed to the plus side, which is one forward. Accordingly, the maximum value after correction is C+1 and the minimum value after correction is zero for yellow. Further, we have C+1<0.75, and therefore the following holds:

maximum value after correction−minimum value after correction<0.75 pixel

Accordingly, processing for correcting amount of color misregistration is terminated.

Thus, the mirror surface of the polygonal mirror 210 is selected in such a manner that the color misregistration between toners will fall within 0.75 pixel at maximum.

FIG. 9 is a diagram illustrating an example of storage with regard to amount of color misregistration after correction. The amount of correction is for a case where amount of color misregistration illustrated in FIG. 8 has been detected. That is, we have maximum value (+0.45)−minimum value (−0.35) =+0.80 and the condition of step S703 is satisfied. Then, since the value of B (+0.40) is positive, the condition of step S704 is satisfied. Further, since B−|C| is such that +0.40−|−0.35|=+0.75 holds, the condition of step S705 also is satisfied. Accordingly, at step S706, the amount A of color misregistration with regard to the Bk toner and the amount B of color misregistration with regard to the C toner are each decremented by 1.

Figure 10:
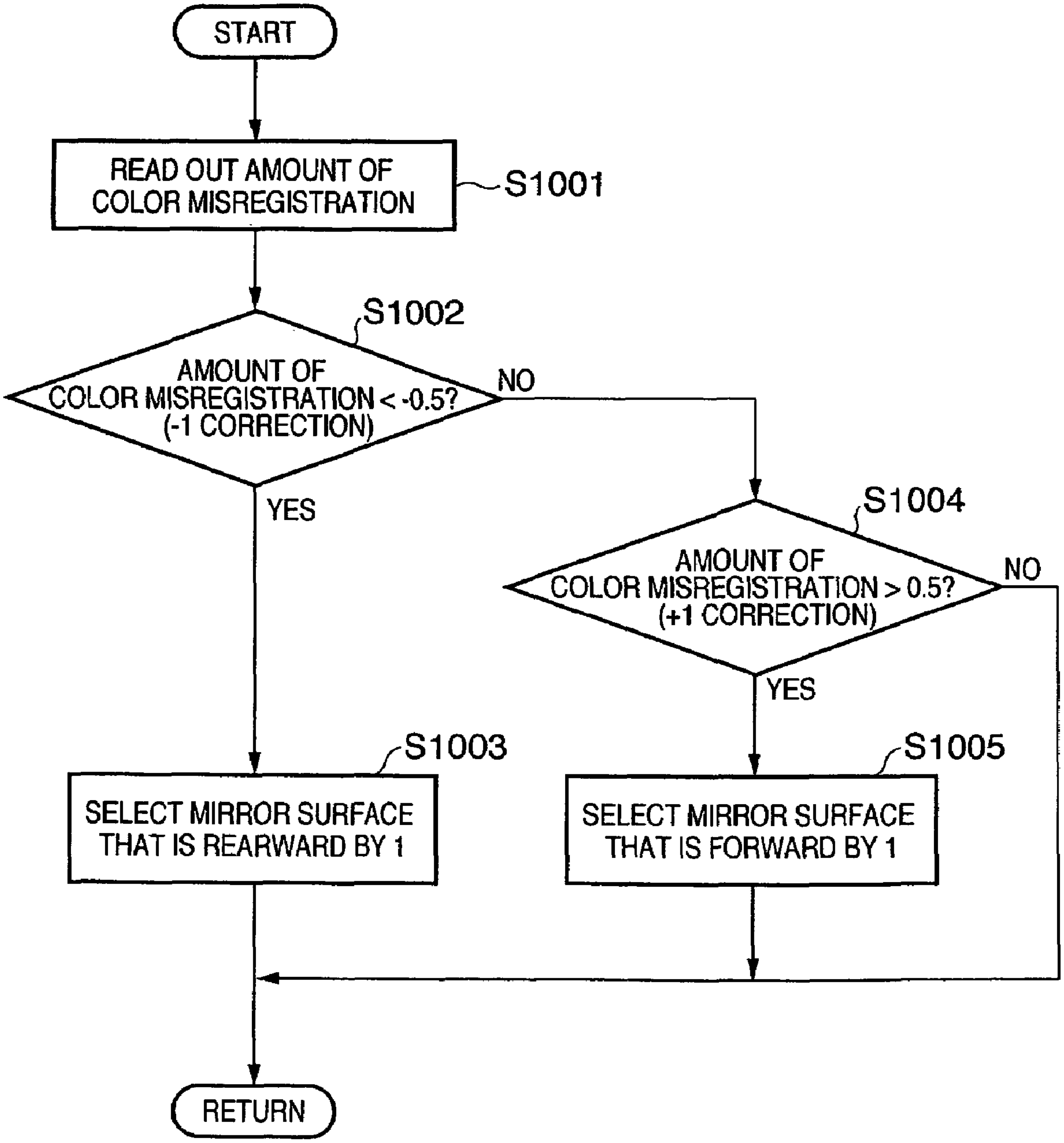
FIG. 10 is a flowchart illustrating an example of registration correction according to the first embodiment.

FIG. 10 is a flowchart illustrating an example of registration correction according to an embodiment. The processing of this flowchart is executed with regard to colors other than the reference color (yellow in the above-described example).

If a print-start signal is input, the system controller 601 reads the amount of color misregistration after correction out of the memory 602 at step S1001.

Next, at step S1002, the system controller 601 determines whether the amount of color misregistration read out at step S1001 is less than −0.5. If a "YES" decision is rendered, then control proceeds to step S1003.

At step S1003, the system controller 601 selects the mirror surface that is one rearward with respect to the mirror surface of the reference color (yellow, for example) as the mirror surface regarding the relevant color. That is, the system controller 601 controls the laser light-emission timing in such a manner that the light beam will strike the mirror surface that is one surface rearward.

On the other hand, if the amount of color misregistration is equal to or greater than −0.5, then the system controller 601 determines whether the amount of color misregistration exceeds 0.5 at step S1004. If a "NO" decision is rendered, it is unnecessary to select a mirror surface anew and therefore this subroutine is exited. On the other hand, if a "YES" decision is rendered, then, at step S1005, the system controller 601 selects the mirror surface that is one forward with respect to the mirror surface of the reference color (yellow, for example) as the mirror surface regarding the relevant color. That is, the system controller 601 controls the laser light-emission timing in such a manner that the light beam will strike the mirror surface that is one surface forward.

Thus, in this embodiment, the mirror surface of the polygonal mirror 210 that is ideal for each color can be selected based upon amount of color misregistration relative to yellow, which is the reference color that has been stored in the memory 602. The system controller 601 thenceforth supplies the electric circuit board 314 with the information concerning the selected mirror surface (light-emission timing). In accordance with this information from the system controller 601, the laser driving circuit of the electric circuit board 314 causes the semiconductor lasers 402, 403, 512, 513 to emit laser beams in conformity with the selected mirror surface of the polygonal mirror 210. By performing exposure by thus selecting the mirror surface of the polygonal mirror 210, it is possible to form an image that has been subjected to a registration correction. The amount of color misregistration at this time is less than (4−1)/4=0.75 pixel and can be made the smallest value.

The color image forming apparatus according to this embodiment as set forth above exposes the plurality of photosensitive drums 201Bk, 201C, 201M, 201Y by simultaneously deflecting and scanning laser beams emitted from a plurality of semiconductor lasers 402, 403, 512, 513. As a result, the number of component parts is reduced. This makes it possible to lower the cost and reduce the size of the scanning-type optical device 102. Moreover, a small amount of available space is exploited effectively and optical path length can be made substantially the same as that of other light beams. This is achieved by reflecting the light beam from the semiconductor laser 403 a plurality of times by the separating return mirror 225 and final return mirror 226, and reflecting the light beam from the semiconductor laser 512 a plurality of times by the separating return mirror 235 and final return mirror 236. As a result, the scanning-type optical device can be made even more compact. This means that the overall color printer 100 can be lowered in cost and reduced in size.

Further, correction of registration can be performed in ideal fashion by selecting a mirror surface of the polygonal mirror 210 on a toner-by-toner basis in such a manner that the amount of color misregistration is reduced. That is, the amount of color misregistration relative to the reference color (e.g., yellow) sensed by the registration sensor 106 is stored in memory 602 in advance. When an image is formed, the system controller 601 controls exposure by selecting the corresponding mirror surface of the polygonal mirror 210 in accordance with the amount of color misregistration of each color. As a result, the amount of color misregistration in the sub-scan direction can be made less than (n−1)/n pixels (where n is a natural number of 2 or greater). As a result, it is possible for the image quality of the color printer 100 to be improved over that of the conventional color image forming apparatus in which color misregistration of a maximum of one pixel occurs.

Further, by making the reference color the color yellow, which is the color of the toner held in the developing unit 203Y that is disposed at a position least susceptible to the effects of heat from the fixing unit 107, the adverse effects of thermal expansion on parts owing to heat from the fixing unit is suppressed.

Second Embodiment

A second embodiment of the invention relates to another example regarding processing for selecting a mirror surface of the polygonal mirror 210. The description that follows will be simplified by identifying locations already described by the same reference characters.

Figure 11:
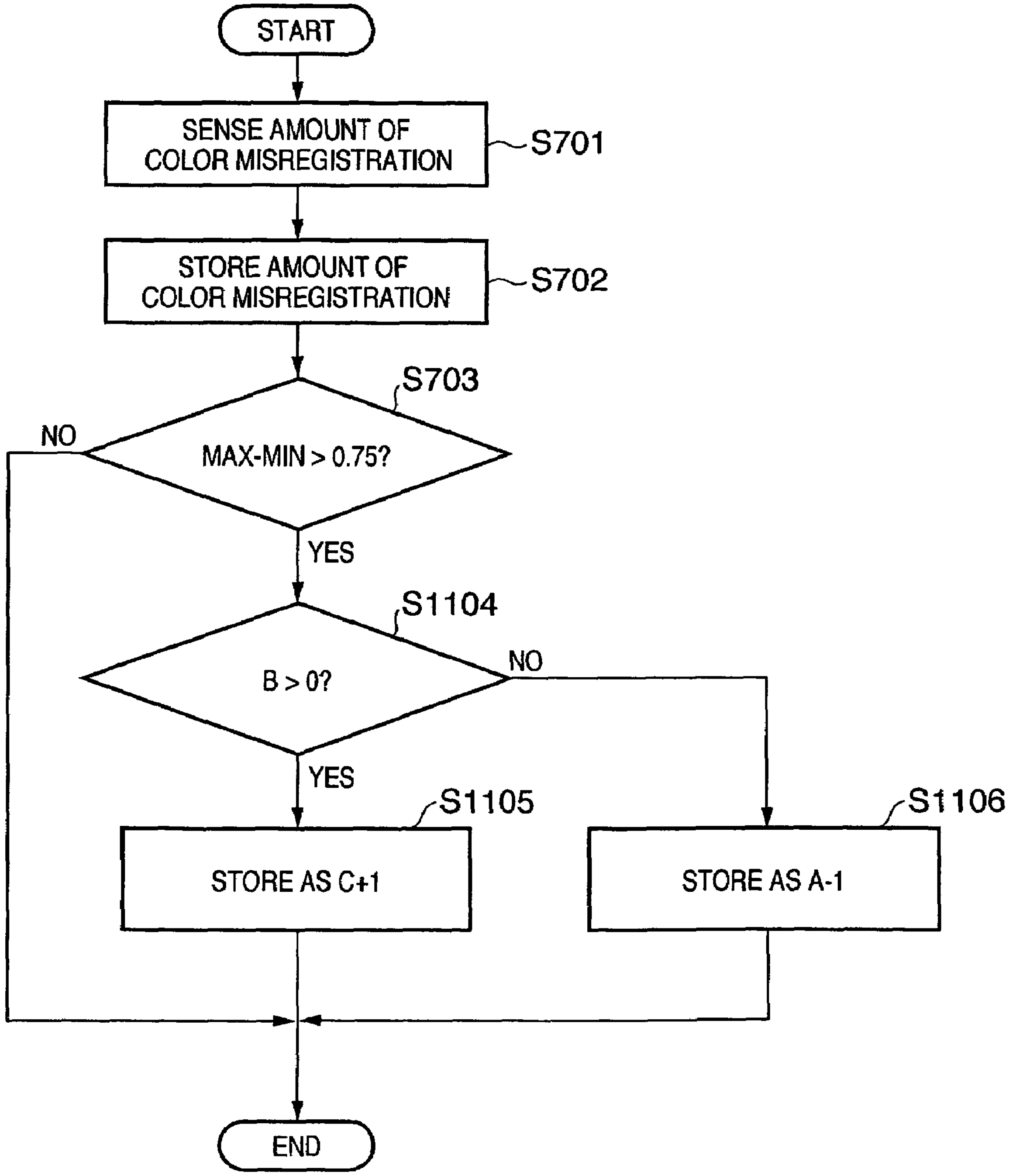
FIG. 11 is an illustrative flowchart of other processing for correcting for color misregistration according to a second embodiment of the present invention.

FIG. 11 is an illustrative flowchart of other processing for correcting for color misregistration according to the second embodiment. The system controller 601 executes the processing of steps S701 to S703 in the manner described above. As a result, if the difference between the maximum and minimum values of amount of color misregistration is determined to exceed 0.75 at step S703, then control proceeds to step S1104.

At step S1104, the system controller 601 determines whether the value of the amount B of intermediate color misregistration is positive. If the value is positive, then control proceeds to step S1105. Here the system controller 601 increments C and stores the result in memory 602. In other words, the system controller 601 changes the mirror surface of the polygonal mirror 210 to the plus side, which is one forward, with regard to the color for which the amount of color misregistration is the intermediate amount B. Accordingly, the maximum value after correction becomes C+1 and the minimum value after correction becomes zero of yellow. Further, C+1≦0.75 holds. As a result, maximum value of amount of color misregistration−minimum value of amount of color misregistration≦0.75 pixel and processing is terminated.

On the other hand, if it is found at step S1104 that the value of B is not positive, then control proceeds to step S1106 and the system controller 601 decrements the value of A and stores the resultant value in the memory 602. In other words, the system controller 601 changes the mirror surface regarding the color corresponding to the amount A of color misregistration to the minus side, which is one rearward. The reason is that the colors corresponding to B and C have been shifted to the minus side of yellow. Accordingly, since the maximum value after correction is zero of yellow, the minimum value is A−1 and A−1≧−0.75 holds. As a result, maximum value of amount of color misregistration−minimum value of amount of color misregistration≦0.75 pixel and processing is terminated.

Thus, in the second embodiment as well, the mirror surface of the polygonal mirror 210 can be selected in such a manner that the amount of color misregistration will be less than (4−1)/4=0.75 at maximum. As a result, the image quality of the color printer 100 can be raised over that of the prior art.

Other Embodiments

The scanning-type optical device of the first and second embodiments has been described with regard to a method in which two laser beams impinge on each of both sides of a single polygonal mirror and four photosensitive drums are exposed. However, it goes without saying that the present invention is applicable also in a color image forming apparatus in which four laser beams are made to impinge upon one side of a single polygonal mirror and four photosensitive drums are exposed.

In the embodiments set forth above, a single rotating polygonal mirror is applied to four photosensitive bodies. However, the present invention is not limited to such an arrangement and can be applied to an image forming apparatus in which m-number (where m is a natural number that is equal to or greater than 1 and less then n) of rotating polygonal mirrors are used with respect n-number (where n is a natural number that is equal to or greater than 2) of photosensitive bodies.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-135429, filed on May 6, 2005, which is hereby incorporated by reference herein in its entirety.

What is claimed is:

1. An electrophotographic image forming apparatus comprising:

n-number (where n is a natural number and n≧2 holds) of photosensitive bodies for carrying toner images that differ from one another;

n-number of light sources for forming latent images on respective ones of said n-number of photosensitive bodies;

a rotating polygonal mirror for causing light beams, which are emitted from said n-number of light sources, to be deflected and to scan across corresponding ones of said photosensitive bodies;

developing units for forming toner images by developing the latent images formed on said photosensitive bodies owing to scanning by said rotating polygonal mirror;

a transfer body to which are transferred the toner images formed on said photosensitive bodies;

a sensing device for sensing an amount of color misregistration with regard to each of the toner images that have been formed on said transfer body;

a selecting device for selecting a mirror surface of said rotating polygonal mirror, which is used in the scanning of every one of the photosensitive bodies, in such a manner that the amount of color misregistration of every one of the toner images will be less than (n−1)/n pixels; and a control device for controlling light-emission timing of said light sources in such a manner that the light beams from said light sources will be deflected and scanned by the selected minor surfaces, wherein said sensing device is a unit for sensing amounts of color misregistration regarding the toner images of colors other than a prescribed color of a toner image; and said selecting device is a unit for selecting the minor surfaces of said rotating polygonal mirror that correspond to said other colors, with the mirror surface of said rotating polygonal minor that corresponds to the prescribed color being adopted as a reference, and wherein if the amounts of color misregistration of the other colors are represented by A, B and C in order of decreasing value, then said selecting device:

selects, with regard to colors corresponding to A and B, the mirror surface that is one surface rearward, in direction of rotation, of the minor surface that corresponds to the prescribed color if B is positive and B−|C| is positive;

selects, with regard to a color corresponding to C, the mirror surface that is one surface forward, in direction of rotation, of the minor surface tat corresponds to the prescribed color if B is positive and B−|C| is not positive;

selects, with regard to a color corresponding to A, the mirror surface that is one surface rearward, in direction of rotation, of the mirror surface that corresponds to the prescribed color if B is not positive and A−|B| is equal to or greater than zero; and selects, with regard to colors corresponding to B and C, the mirror surface that is one surface forward, in direction of rotation, of the mirror surface that corresponds to the prescribed color if B is not positive and A−|B| is not equal to or greater than zero.

2. The apparatus according to claim 1, further comprising a fixing unit which fixes the toner images transferred from said transfer body on a printing medium by heating, wherein a distance between said fixing unit and the developing unit corresponding to the prescribed color is longer than that of between said fixing unit and another developing unit which corresponds to another color being different from the prescribed color.

3. An electrophotographic image forming apparatus comprising:

n-number (where n is a natural number and n≧2 holds) of photosensitive bodies for carrying toner images that differ from one another;

n-number of light sources for forming latent images on respective ones of said n-number of photosensitive bodies;

a rotating polygonal mirror for causing light beams, which are emitted from said n-number of light sources, to be deflected and to scan across corresponding ones of said photosensitive bodies;

developing units for forming toner images by developing the latent images formed on said photosensitive bodies owing to scanning by said rotating polygonal mirror;

a transfer body to which are transferred the toner images formed on said photosensitive bodies;

a sensing device for sensing an amount of color misregistration with regard to each of the toner images that have been formed on said transfer body;

a selecting device for selecting a mirror surface of said rotating polygonal mirror, which is used in the scanning of every one of the photosensitive bodies, in such a manner that the amount of color misregistration of every one of the toner images will be less than (n−1)/n pixels; and a control device for controlling light-emission timing of said light sources in such a manner that the light beams from said light sources will be deflected and scanned by the selected mirror surfaces, wherein said sensing device is a unit for sensing amounts of color misregistration regarding the toner images of colors other than a prescribed color of a toner image; and said selecting device is a unit for selecting the mirror surfaces of said rotating polygonal mirror that correspond to said other colors, with the mirror surface of said rotating polygonal mirror that corresponds to the prescribed color being adopted as a reference, and wherein if the amounts of color misregistration of each of the other colors are represented by A, B and C in order of decreasing value, then said selecting device:

selects, with regard to a color corresponding to C, the mirror surface that is one surface forward, in direction of rotation, of the mirror surface that corresponds to the prescribed color if B is positive; and selects, with regard to a color corresponding to A, the mirror surface that is one surface forward, in direction of rotation, of the mirror surface that corresponds to the prescribed color if B is not positive.

4. The apparatus according to claim 3, further comprising a fixing unit which fixes the toner images transferred from said transfer body on a printing medium by heating, wherein a distance between said fixing unit and the developing unit corresponding to the prescribed color is longer than that of between said fixing unit and another developing unit which is corresponds to another color being different from the prescribed color.

5. An electrophotographic image forming apparatus for forming image with toners of a plurality of different colors comprising:

a plurality of photosensitive bodies for carrying toner images, wherein each toner image carried by said photosensitive bodies is different from each other, a plurality of light sources for forming latent images on respective ones of said photosensitive bodies, wherein said plurality of light sources correspond to the plurality of colors;

a deflecting unit for causing light beams, which are emitted from said plurality of light sources, to be deflected and to scan across corresponding ones of said photosensitive bodies;

developing units for forming toner images by developing the latent images;

a transfer body to which are transferred the toner images formed on said photosensitive bodies;

a sensing device for sensing an amount of color misregistration with regard to each of the toner images that have been formed on said transfer body; and a control device for controlling light-emission timing of said light sources based on sensed results of the sensing device, wherein, with respect to an amount of color misregistration associated with three colors of toner images to be superimposed on a prescribed color of a toner-image the sign of the amount of color misregistration becomes positive if the toner images of the three colors are shifted to the toner image of the prescribed color in a carrying direction of said transfer body, and the sign of the amount of color misregistration become negative if the toner images of the three colors are shifted to the toner image of the prescribed color in a direction opposed to the carrying direction of said transfer body, and amounts of color misregistration of the toner images of the other three colors are defined as A, B and C respectively, and represented by A>B>C, and wherein said control device:

controls, if B is positive and B−|C| is positive or zero, the emitting timing of said light sources corresponding to A and B such that the light beams corresponding to A and B are deflected by a deflection surface that is one surface rearward of the deflecting surface that corresponds to the prescribed color;

controls, if B is positive and B−|C| is negative, the emitting timing of said light source corresponding to C such that the light beam corresponding to C is deflected by a deflection surface that is one surface forward of the deflecting surface that corresponds to the prescribed color;

controls, if B is negative and A−|B| is positive or zero, the emitting timing of said source corresponding to A such that the light beam corresponding to A is deflected by a deflection surface that is one surface reward of the deflecting surface that corresponds to the prescribed color; and controls, if B is negative and A−|B| is negative, the emitting timing of said light sources corresponding to B and C such that the light beams corresponding to B and C are deflected by a deflection surface that is one surface forward of the deflecting surface that corresponds to the prescribed color.

6. The apparatus according to claim 5, further comprising a fixing unit which fixes the toner images transferred from said transfer body on a printing medium by heating, wherein a distance between said fixing unit and the developing unit corresponding to the prescribed color is longer than that of between said fixing unit and another developing unit which is corresponds to another color being different from the prescribed color.

7. An electrophotographic image forming apparatus for forming image with toners of a plurality of different colors comprising:

a plurality of photosensitive bodies for carrying toner images, wherein each toner image carried by said photosensitive bodies is different from each other;

a plurality of light sources for forming latent images on respective ones of said photosensitive bodies, wherein said plurality of light sources correspond to the plurality of colors;

a deflecting unit for causing light beams, which are emitted from said plurality of light sources, to be deflected and to scan across corresponding ones of said photosensitive bodies;

developing units for forming toner images by developing the latent images;

a transfer body to which are transferred the toner images formed on said photosensitive bodies;

a sensing device for sensing an amount of color misregistration with regard to each of the toner images that have been formed on said transfer body; and a control device for controlling light-emission timing of said light sources based on sensed results of the sensing device, wherein, with respect to an amount of color misregistration associated with the three colors of toner images to be superimposed on a prescribed color of a toner image, the sign of the amount of color misregistration becomes positive if the toner images of the three colors are shifted to the toner image of the prescribed color in a carrying direction of said transfer body, and the sign of the amount of color misregistration become negative if the toner images of the three colors are shifted to the toner image of the prescribed color in a direction opposed to the carrying direction of said transfer body, and amounts of color misregistration of the toner images of the three colors are defined as A, B and C respectively, and represented by A>B>C, and wherein said control device:

controls, if B is positive, the emitting timing of said light source corresponding to C such that C becomes positive;

controls, if B is negative, the emitting timing of said light source corresponding to A such that A becomes negative.

8. The apparatus according to claim 7, further comprising a fixing unit which fixes the toner images transferred from said transfer body on a printing medium by heating, wherein one of the fixing units corresponding to the prescribed color is located apart from another fixing unit which is corresponds to another color being different from the prescribed color.

* * * * *